United States Patent Office 3,652,506
Patented Mar. 28, 1972

3,652,506
PROCESS FOR THE PREPARATION OF POLY-
URETHANE PREPOLYMERS COMPRISING
TERMINAL ISOCYANATE GROUPS
Alain Gibier-Rambaud and Bernard Blanc, Martigues,
France, assignors to Naphtachimie, Paris, France
No Drawing. Continuation-in-part of abandoned application Ser. No. 804,703, Mar. 5, 1969. This application July 22, 1970, Ser. No. 57,295
Claims priority, application France, July 25, 1969,
6925422
Int. Cl. C08g 22/34
U.S. Cl. 260—77.5 AB                                8 Claims

ABSTRACT OF THE DISCLOSURE

Preparation of polyurethane prepolymers having terminal isocyanate groups comprising reacting an organic polyisocyanate with a polyhydroxylated compound having less than 0.1 percent by weight of water in the presence of a hydrolyzable metal halide at a temperature within the range of 50° to 100° C.

---

This is a continuation-in-part of our copending application Ser. No. 804,703, filed Mar. 5, 1969, and entitled "Process for Preparation of Polyurethane Prepolymers Comprising Terminal Isocyanate Groups" and now abandoned.

This invention relates to storage-stable polyurethane prepolymers having terminal isocyanate groups in which the prepolymers are intended for use in the production of cross-linked polyurethanes for use in paints, varnishes, coatings, adhesives and elastomers.

Polyurethane prepolymers of the type described have been prepared by the reaction of polyhydroxylated compounds with organic polyisocyanates in excess of the stoichiometric amount. The prepolymers prepared in accordance with the described method suffer from the disadvantage in that they continue to develop during storage. This development, which is manifested by a reduction in the number of free isocyanate groups and by an increase in the viscosity of the material, is due to undesirable secondary reactions such as reactions forming functional urea or allophanate groups.

Such progressive reduction in the number of isocyanate groups is disadvantageous in that it reduces the possibilities of cross-linking in subsequent reaction with compounds having hydrogen atoms which are active with respect to the isocyanates. The increase in viscosity, which accompanies the reduction in the number of free isocyanate groups, sometimes makes it difficult to use these prepolymers. Finally, such development makes it necessary precisely to measure the amount of free isocyanate in the prepolymer before use in the preparation of high quality polyurethanes by addition of the correct amount of cross-linking agent.

It is known that certain hydrolyzable salts, such for example as antimony or tin chlorides, may be added to the polyurethane prepolymers having terminal isocyanate groups in amounts within the range of 0.08% to 5% with respect to the total weight of the prepolymer. The addition of these chlorides yields the advantage of catalyzing the cross-linking reaction of these prepolymers by means of compounds having active hydrogen atoms, but it does not provide effective stabilization.

It is also known that, in order to prevent the formation of bubbles in the polyurethane masses, the water contained in the polyhydroxylated compound to which various fillers may be added, should be eliminated as by means of fairly large amounts, generally between 2.5% and 5% by weight, of aluminium or magnesium halides, before reaction with the polyisocyanate.

This process is subject to a number of disadvantages. On the one hand, acid formed in corresponding amounts causes corrosion of the equipment. On the other hand, metal hydroxides, which are also formed, give rise to turbidity which, from a practical standpoint, prohibits utilization in certain applications, such as varnishes. Fine-utilization in certain applications, such as varnishes. Finally, catalysis of the polyurethane formation reaction, which is currently effected by means of amino compounds such as triethylenediamine or N-methylmorpholine, is greatly disturbed by the possible excess of halides which are introduced.

It has been found and it is an object of this invention to prepare polyurethane prepolymers which are very stable upon storage and which have a very small number of undesirable functional groups of the type urea or allophanate.

In accordance with the practice of this invention, the desired results have been obtained by using in the preparation, a polyhydroxylated compound which has previously been dehydrated and to which are added very small amounts of hydrolyzable halides of metals of the group consisting of titanium, aluminium, silicon and boron.

Additionally, the polyurethane prepolymers produced in accordance with this invention, with titanium and/or aluminium halides, have the advantage of being readily pigmented, which makes them easy to use, it being possible simply to follow homogenization of mixtures thereof with the cross-linking agent that is used.

Thus, the present invention relates to a process for the preparation of a polyurethane prepolymer having terminal isocyanate groups by reaction, at a temperature within the range of 50° to 100° C., of an organic polyisocyanate and a polyhydroxylated compound containing less than 0.2% by weight of water, with the addition of an amount of hydrolyzable metal halide within the range of 100 to 5,000 parts per million by weight of the polyhydroxylated compounds.

The invention also concerns, as a new industrial product, the polyurethane prepolymers produced by the described process and the cross-linked polyurethanes produced from said prepolymers and compounds having at least two hydrogen atoms which are reactive with respect to the isocyanates.

As the polyhydroxylated compound, it is possible to make use of a wide variety of such compounds. In particular, use can be made of polyols such as alkyleneglycols, i.e. ethylene glycol, propylene glycol and the like, glycerol, trimethylolpropane, pentaerythritol, sorbitol or polyetherpolyols produced by the reaction of ethylene oxide and/or propylene oxide and said polyols.

The polyhydroxylated compounds are first dehydrated to a water content of less than 0.2% by weight and preferably less than 0.05% by weight. Dehydration can be effected by physical methods, preferably by simply heating the polyhydroxylated compounds under vacuum. In the dehydrated polyhydroxylated compound, the residual water content is determined preferably by the method of Karl Fischer.

Any of the hydrolyzable halides of metals of the group consisting of titanium, aluminium, silicon and boron can be used. Excellent results can be obtained by using aluminum trichloride or titanium tetrachloride. As further illustrations of the polyvalent metal halides which may be employed and for various uses hereinafter to be described the hydrolyzable metal halides can be selected of silicon and boron halides. The halides are preferably in the form of the chlorides, but the iodides and fluorides can be used.

The quantity of metal halide introduced is calculated with reference to the amount of water present in the polyhydroxylated compound. It is sufficient, for the purpose of obtaining a prolonged stabilization effect, to make use of an amount of metal halide less than the theoretical stoichiometric quantity, generally within the range of 5% to 50% of said quantity; this corresponds to an amount of metal halides within the range of 100 to 5,000 p.p.m. by weight in relation to the polyhydroxylated compounds, as previously described. In order to obtain good results, it has been found that the ratio by weight between the amount of chloride used and the amount of water contained in the polyhydroxylated compound should be higher than 0.8 when use is made of titanium tetrachloride or higher than 2.0 when use is made of aluminum trichloride.

The polyhydroxylated compound and the chloride can be easily premixed by simple agitation, preferably with stirring, at ambient temperature or at a slightly higher temperature, depending somewhat upon the fluidity of the polyhydroxylated compounds that are used. When use is made of aluminum trichloride, it should be crushed first to a sufficiently fine powder.

A wide variety of organic polyisocyanates can be used to prepare the prepolymers in accordance with the prectice of this invention. For this purpose, it is preferred to make use of aliphatic polyisocyanates, such as hexamethylene diisocyanate or aromatic polyisocyanates, such as toluene diisocyanate and diphenylmethane diisocyanate.

The prepolymers can be prepared in the conventional manner by mixing the organic polyisocyanate and the polyhydroxylated compound. It is possible to add the organic polyisocyanate immediately after introduction of the halogenated compound. This operation is carried out preferably with stirring and at a temperature within the range of 50° to 100° C. and contact under these conditions is continued until a complete reaction of the hydroxyl functions is obtained, which may be for a number of hours.

The prepolymers prepared with titanium and/or aluminium halides have the unique property in that they are pigmented and thus enable easy visualization of the mixture produced, starting with the prepolymer. However, for certain uses, especially in the manufacture of varnishes, even slight pigmentation may be undesirable such that it becomes desirable to be able to prepare a prepolymer which is as clear as possible.

It has been discovered that polyurethane prepolymers of increased transparency can be secured when the hydrolyzable metal halide, added in small amounts to the polyhydroxylated compound, is selected of a halide of boron and/or silicon, such as silicon tetrachloride and/or boron trichloride.

The resulting prepolymers are highly stable. They can be stored, if sheltered from air, for several months and longer without deterioration in their properties.

The prepolymers can be cross-linked by means of various compounds having hydrogen atoms which are active with respect to the isocyanates, such for example as in the presence of high humidity, water, a polyol, a polyether-polyol or a polyamine. It is thus possible to produce polyurethanes and/or polyurea polyurethanes in the form of paints, varnishes, coating materials, adhesives, mastics and elastomers having remarkable mechanical properties and a high degree of resistance to chemical agents.

The following examples are given by way of illustration, but not by way of limitation.

EXAMPLE 1

A polyether-triol having a molecular weight of about 3,000, such as produced by the reaction of propylene oxide and glycerol, is dehydrated by heating to a temperature of about 120° C. at a pressure of less than 20 mm. of mercury for one hour.

The polyether-polyol is then cooled and its water content, measured by the Karl Fischer method, is 270 parts per million by weight (p.p.m.).

First an amount of titanium tetrachloride corresponding to 350 p.p.m. and then, one minute later, twice the stoichiometric amount of toluene-diisocyanate is introduced rapidly and with agitation into this polyether-polyol. The mixture is heated and maintained at a temperature of 70° C. for 3 hours.

The resulting prepolymer has an isocyanate content equal to 3.55% by weight and a viscosity of 160 poises. Its properties remain unchanged after air-proof storage for a period of five months.

In a second comparative test, a prepolymer is prepared of the same compounds in the same proportions, but without titanium tetrachloride. With the reaction medium being maintained at 70° C. for seven hours, a product which titrates 4% by weight of free isocyanate groups is obtained.

The development of the free NCO content, as a function of time, is indicated in Table I.

TABLE I

| Time: | Free NCO content, percent |
|---|---|
| 1 day | 3.85 |
| 2 days | 3.65 |
| 5 days | 3.55 |
| 12 days | 3.35 |
| 26 days | 3.30 |

In a third test, a prepolymer is first prepared as in the second test, comprising 4% of free NCO groups, to which addition of 350 parts per million of titanium tetrachloride is made. The addition of titanium tetrachloride does not provide a stabilization of the prepolymer, the development of which, as a function of time, is indicated in Table II.

TABLE II

| Time: | Free NCO content, percent |
|---|---|
| 1 day | 3.40 |
| 2 days | 3.35 |
| 5 days | 3.30 |
| 12 days | 3.25 |

EXAMPLE 2

A polypropylene glycol, having a molecular weight of approximately 2,000 is dried for two hours under a vacuum of less than 20 mm. of mercury at a temperature of about 80° C. It is then cooled to 30° C. and analyzed to contain 110 p.p.m. water, using the Karl Fischer method.

250 p.p.m. aluminum trichloride in molar solution in volatile oil are then introduced rapidly, with vigorous agitation into the polypropylene glycol followed after an interval of one minute, by the addition of twice the stoichiometric amount of toluene diisocyanate. The mixture maintains itself without further heating at a temperature of 60° to 70° C. for about two hours.

The prepolymer obtained has an isocyanate content of 3.5% which is subsequently retained.

EXAMPLE 3

Trimethylolpropane is subjected to azeotropic drying with toluene as the solvent. After removing all of the solvent, it will be found that the trimethylolpropane has a water content of 150 p.p.m. by weight, using the Karl Fischer method.

Two parts by weight of ethyl acetate for one part by weight of trimethylolpropane are mixed and 300 p.p.m. by weight, calculated on the amount of trimethylolpropane, of titanium tetrachloride are added to this mixture in the form of a molar solution in a volatile oil.

The resulting solution is progressively introduced into twice the stoichiometric amount of toluene diisocyanate maintained at 70° C. As soon as the addition of the triol is concluded, the prepolymer obtained has an isocyanate content of 14.8% which is subsequently maintained.

EXAMPLE 4

Example 1 is repeated, but instead of making use of glycerol use is made of an equivalent amount of other alkylene-glycols such as pentaerythritol, sorbitol and polyether-polyols.

EXAMPLE 5

Example 1 is repeated, but instead of making use of toluene diisocyanate, use is made of an equivalent amount of hexamethylene diisocyanate of diphenylmethane diisocyanate.

EXAMPLE 6

Use is made of a polyether diol having a molecular weight of about 2,000, prepared by condensation of propylene oxide on glycol. The polyether diol is dehydrated by heating in vacuum for two hours at 110° C., under an absolute pressure of 20 mm. Hg. After cooling the polyether diol, the water content, which is determined by the Karl Fischer method, is found to be 100 p.p.m. 200 p.p.m. of silicon tetrachloride (SiCl$_4$) is rapidly introduced with stirring in the form of a molar solution in CCl$_4$. The amount of SiCl$_4$ corresponds to 42.5% of the stoichiometric quantity necessary for consuming 100 p.p.m. of residual water calculated to be present in the dehydrated polyether diol.

15 minutes later, introduction is made into 1,000 parts of the polyether diol of 175 parts of toluene diisocyanate, corresponding to about twice the stoichiometric quantity. The mixture is heated and held with stirring for three hours at 70° C. After cooling, there is found a free isocyanate in the amount of 4.13%. In the course of storage, the amount of free isocyanate becomes progressively reduced and stabilizes at 3.50%, a rate which is very close to theoretical value.

The prepared prepolymer keeps very well in storage. It is not pigmented with the results that it is particularly suitable for the preparation of varnishes.

EXAMPLE 7

Use is made of a polyether triol having a molecular weight of about 3,000, prepared by condensation of propylene oxide on glycerine. The polyether triol is dehydrated by heating in a vacuum of 120° C. under a residual pressure of 20 mm. Hg. After cooling, the residual water content of the polyether triol is determined by the Karl Fischer method, indicating a content of 90 p.p.m. of water. With vigorous stirring, there is rapidly introduced into the dehydrated polyether triol, 180 p.p.m. of boron trichloride (BCl$_3$) in the form of a molar solution in petrol. This quantity of BCl$_3$ corresponds to 46% of the stoichiometric quantity necessary to consume the 90 p.p.m. of residual water.

About 15 minutes later, there are introduced into 1,000 parts of the treated polyether triol, 174 parts of toluene diisocyanate, corresponding to about twice the stoichiometric quantity. The mixture is heated and held at 70° C. for three hours with stirring. After cooling, free isocyanate in the amount of 3.5% is found. This value remains constant during storage of the prepolymer.

EXAMPLE 8

Use is made of the same polyether triol as in the preceding Example 7. After dehydration by heating it in vacuum, the polyether triol is found to have a residual water content of 50 p.p.m. Into the dehydrated polyether triol, there is introduced 100 p.p.m. of SbCl$_5$ as a molar solution in petrol. After introduction of 174 parts of toluene diisocyanate to 1,000 parts of the treated polyether triol, and after heating for three hours at 70° C., a free isocyanate content of 3.90% is measured. After five days, the free isocyanate falls to 3.45% and becomes uniformly reduced during subsequent storage to 3.25% after 13 days and 3.15% after 17 days.

It will be understood that changes may be made in the details of formulation and operation without departing from the spirit of the invention, especially as defined in the following claims.

We claim:

1. A process for the preparation of polyurethane prepolymers having terminal isocyanate groups comprising combining a polyhydroxylated compound containing less than 0.2% by weight water with a hydrolyzable halide selected from the group consisting of silicon halides, boron halides and mixtures thereof in an amount within the range of 100 to 5,000 parts per million by weight and reacting the resulting mixture with an organic polyisocyanate.

2. The process as claimed in claim 1 in which the reaction is carried out at an elevated temperature within the range of 50° to 100° C.

3. The process as claimed in claim 1 in which the polyhydroxylated compound is a polyol or a polyether-polyol obtained by the reaction of a polyol with an alkylene oxide selected from the group consisting of ethylene oxide, propylene oxide and mixtures thereof.

4. The process as claimed in claim 3 in which the polyol is selected from the group consisting of alkyleneglycols, glycerol, trimethylolpropane, pentaerythritol and sorbitol.

5. The process as claimed in claim 1 which includes the step of dehydrating the polyhydroxylated compounds to a water content below 0.2% by weight by distillation under vacuum.

6. The process as claimed in claim 5 in which the water content is reduced to less than 0.05% by weight.

7. As new industrial products, the polyurethane prepolymers produced by the process according to claim 1.

8. Cross-linked polyurethanes produced by the reaction of the prepolymers of claim 7 with compounds having, per molecule, at least two hydrogen atoms which are active with respect to the isocyanates.

References Cited

UNITED STATES PATENTS 3,061,557  10/1962  Hostettler et al. _____ 260—77.5

OTHER REFERENCES

Britain: Ind. & Engr. Chem. Prod. Res. & Dev., vol. 1, No. 4, pp. 261–264, 1962.

Saunders et al.: Polyurethanes, Part II, Interscience, N.Y., 1964, pp. 8, 9, 14, 15 and 202.

DONALD E. CZAJA, Primary Examiner

M. J. WELSH, Assistant Examiner

U.S. Cl. X.R.

260—75 NB